(12) United States Patent
Wetzels et al.

(10) Patent No.: US 8,491,828 B2
(45) Date of Patent: Jul. 23, 2013

(54) DEVICE AND METHOD FOR PRODUCING A FIBER COMPOSITE PRODUCT

(75) Inventors: Jacky Ferdinand Henriette Wetzels, Delft (NL); Lucas Stefan Van Den Akker, Rotterdam (NL); Sotiris Koussios, The Hague (NL); Lei Zu, Xi'an (CN)

(73) Assignee: Protension IP Assets B.V., Delft (NL)

( * ) Notice: Subject to any disclaimer, the term of this patent is extended or adjusted under 35 U.S.C. 154(b) by 0 days.

(21) Appl. No.: 13/574,875

(22) PCT Filed: Feb. 3, 2011

(86) PCT No.: PCT/NL2011/050075
§ 371 (c)(1),
(2), (4) Date: Jul. 24, 2012

(87) PCT Pub. No.: WO2011/096805
PCT Pub. Date: Aug. 11, 2011

(65) Prior Publication Data
US 2012/0301654 A1 Nov. 29, 2012

(30) Foreign Application Priority Data

Feb. 4, 2010 (NL) ..................................... 2004191

(51) Int. Cl.
*B29C 70/38* (2006.01)
(52) U.S. Cl.
USPC ........... 264/257; 264/258; 264/310; 425/375; 425/470
(58) Field of Classification Search
USPC ................... 264/257, 258, 310; 425/375, 470
See application file for complete search history.

(56) References Cited

U.S. PATENT DOCUMENTS 5,490,472 A  2/1996 Hulse et al.

FOREIGN PATENT DOCUMENTS

| DE | 10 2005 041940 A1 | 3/2007 |
|----|-------------------|--------|
| EP | 1 231 077 A2 | 8/2002 |
| FR | 361.387 A | 6/1906 |
| GB | 2 112 700 A | 7/1983 |
| JP | 60-118579 A | 6/1985 |

OTHER PUBLICATIONS

International Search Report for corresponding Internatinal Application No. PCT/NL2011/050075 mailed Jul. 14, 2011.
Written Opinion of the International Searching authority for corresponding International Application No. PCT/NL2011/050075 mailed Jul. 14, 2011.

*Primary Examiner* — Joseph S Del Sole
*Assistant Examiner* — James Sanders
(74) *Attorney, Agent, or Firm* — Renner, Otto, Boisselle & Sklar, LLP

(57) ABSTRACT

The invention relates to a device for producing a toroid-shaped fiber composite product. The device comprises at least two fiber or fiber composite material dispensing units (2, 3), the dispensing units being adapted to place a fiber (4) or a fiber composite material onto the surface of a toroid-shaped mandrel (5); positioning means to effectuate relative movement of the mandrel and the dispensing units during placement of the fiber or fiber composite material. The invention further relates to a method for producing a toroid-shaped fiber composite product, preferably with a concave cross-section, in particular the rim of a bicycle wheel. The method comprises providing a toroid-shaped mandrel, dispensing fibers or fiber composite material from at least two dispensing units, placing the fibers or fiber composite material onto the mandrel while effectuating a relative movement of the mandrel and the dispensing units, and reshaping at least part of the mandrel, preferably by thermoforming.

24 Claims, 4 Drawing Sheets

DEVICE AND METHOD FOR PRODUCING A FIBER COMPOSITE PRODUCT

Figure 1:
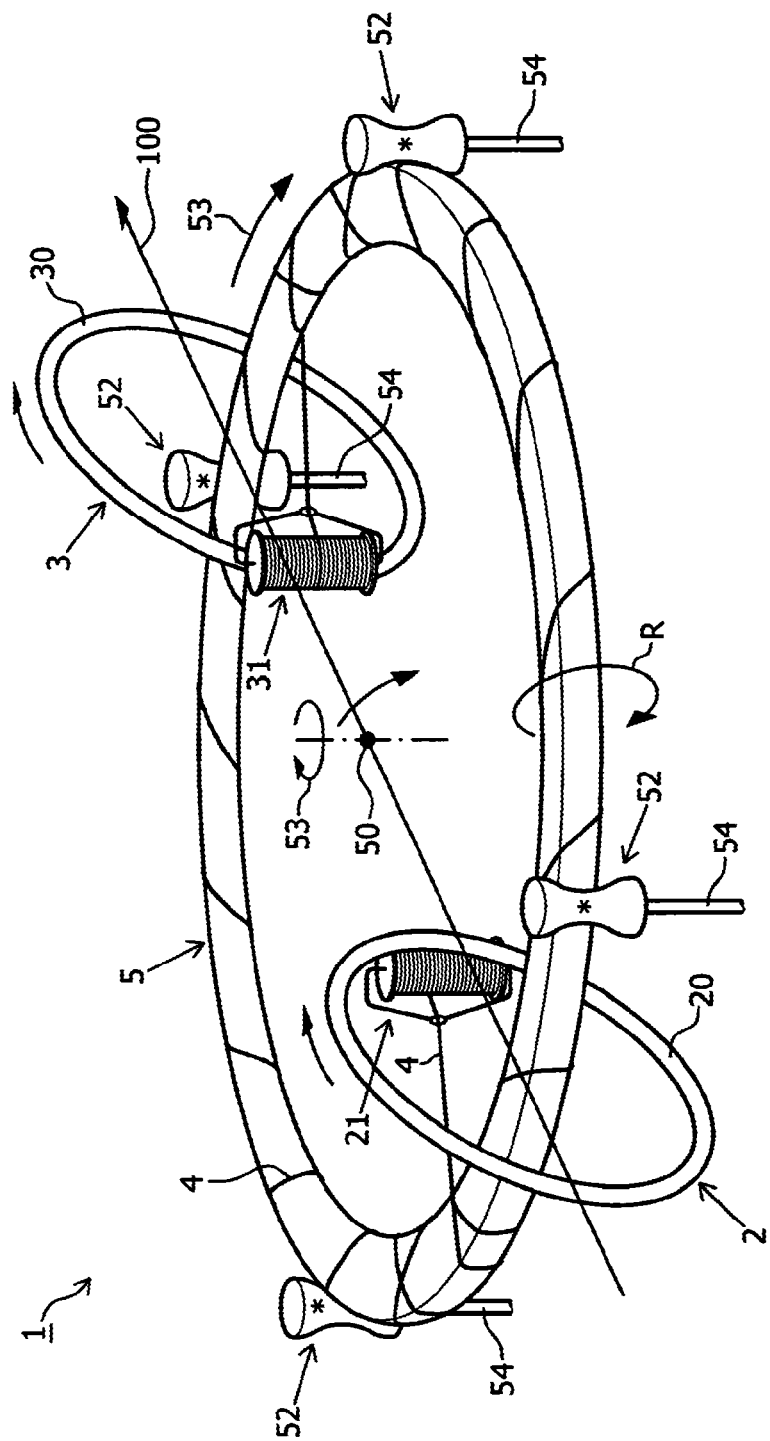

This application is a national phase of International Application No. PCT/NL2011/050075 filed Feb. 3, 2011 and published in the English language and claims priority to NL Application No. 2004191 filed Feb. 4, 2010.

The present invention relates to a device and method for producing a fiber composite product, in particular a toroid-shaped fiber composite product, more in particular a product with a concave cross-section, such as the rim of a bicycle wheel.

The advantages of fiber composite materials, such as glass or carbon fiber epoxy composite materials are widely known in the industry. Fiber composite materials offer high stiffness and strength for a relatively low weight, at least compared to metals. As fiber composite materials derive their excellent properties mainly from the strong and stiff fibers (and less from the matrix) it is important to be able to position the fibers in those directions in a composite product that carry most of the stress under typical loading conditions.

To achieve this goal, a wide variety of methods for producing a fiber composite material product have been developed. The filament winding method involves placing fibers or a fiber composite intermediate material, such as a prepreg tape or tow, onto the surface of a mandrel, optionally impregnating the fibers with a matrix resin, and curing the filament wound product. In filament winding, use is made of a stationary fiber (composite material) dispensing unit, typically in the form of a creel provided with fiber spools, and a mandrel that rotates around its axis of revolution.

Although the filament winding method offers advantages in terms of production speed, it also has its drawbacks, the most important being that the range of feasible product shapes is limited to rotationally symmetric products, unless special precautions are taken.

FR 361 387 A discloses a device for producing a toroid-shaped braid to be used as reinforcement in a rubber tire. The device comprises one fiber dispensing unit in the form of a ring that surrounds a toroid-shaped mandrel in a circumferential direction thereof. The ring is provided with a plurality of spools which allows to form a braid around the mandrel. The movements of ring and mandrel are coupled by one transmission means.

JP 60 118579 A also discloses a device for producing a toroid-shaped fiber composite product. The device comprises one prepreg dispensing unit in the form of a ring that surrounds a toroid-shaped mandrel in a circumferential direction thereof. The ring is positioned at an angle to the circumferential direction of the mandrel and provided with a plurality of prepreg delivery units which allow to place a number of prepreg fibers onto the mandrel simultaneously in a mutually parallel fashion at one angle with the circumferential direction of the mandrel only, at least for one revolution of the ring around the mandrel. The use of a plurality of delivery units makes it difficult to make products with shapes that differ substantially from a round toroid.

It would be desirable to provide a device and method enabling to produce fiber composite products having intricate shapes in substantially one piece only, i.e. without the need for assembling the product. In particular a device and method for producing a toroid-shaped fiber composite product, such as the rim of a bicycle wheel, would be desirable. It is a further object to provide a device and method for producing a fiber composite product with a concave cross-section. It is a further object of the present invention to provide a device and method for producing such a fiber composite product in a reproducible and controlled way. It is a further object of the present invention to provide a device and method for producing a rim of a bicycle with accurate and uniform/homogeneous properties, such as roundness.

This and other objectives are achieved by a device according to claim 1. In particular, a device for producing a toroid-shaped fiber composite product is provided, the device comprising:

at least two fiber or fiber composite material dispensing units, being adapted to place a fiber or a fiber composite material onto the surface of a toroid-shaped mandrel; and positioning means to effectuate relative movement of the mandrel and the dispensing units during placement of the fiber or fiber composite material;

wherein the at least two dispensing units each comprise:

a ring-shaped guide means that surrounds the mandrel in a circumferential direction thereof;

at least one fiber or fiber composite material delivery device for placing said material onto the surface of the mandrel, the delivery device being movable along or with the guide means relative to the surface of the mandrel.

The invention further relates to a method for producing a toroid-shaped fiber composite product, the method comprising:

providing a toroid-shaped mandrel;

dispensing at least one fiber or fiber composite material per each of at least two dispensing units, each comprising a ring-shaped guide means that surrounds the mandrel in a circumferential direction thereof, along or with which each guide means a delivery device is moved relative to the surface of the mandrel;

placing the at least one fiber or fiber composite material per dispensing unit onto the mandrel while effectuating relative movements of the mandrel and the dispensing units.

The surface of the mandrel may comprise a bare surface or may comprise a surface onto which fiber or fiber composite material has already been positioned.

The device according to the invention is in particular suitable for carrying out the method according to the invention. With the device and method according to the invention a toroid-shaped composite article can be manufactured having better properties, in particular in terms of uniformity of strength and stiffness, and having more flexibility in terms of laminate composition, than toroid-shaped articles, made by more conventional methods. An important feature of the invention involves the use of at least two fiber or fiber composite material dispensing units that are spaced apart over some distance in the circumferential direction of the mandrel. It becomes possible by such arrangement to place fibers under a positive angle (+α) with the longitudinal axis of the mandrel by the first dispensing unit, and positionally thereafter place fibers under a negative angle (−α) with the longitudinal axis of the mandrel by a second dispensing unit, positionally lagging behind the first dispensing unit. In this way it becomes possible to produce a ply (a layer) wherein both (+α) and (−α) fiber angles are present in an alternating fashion in substantially the same amount. Such a ply will be termed a balanced angle-ply in the context of this application. Several such balanced angle plies may be stacked on top of each other to obtain a laminate by rotating the at least two dispensing units a number of times around (along the circumference of) the mandrel, whereby changing the relative speeds of movement of dispensing units and mandrel yields different fiber angles being positioned on the mandrel. This is in contrast with the known method, as described in JP 60 118579 for instance, wherein each ply comprises fibers under one angle with the longitudinal axis of the mandrel only. Such a ply will be termed an angle-ply in the context of this application. With the device and method according to the invention, a composite article, comprising a number of stacked balanced angle plies, can be made using two uncut/continuous fiber yarns only. The laminate produced accordingly is fully homogeneous along the longitudinal direction of the product, as opposed to the laminate produced with the known method. There, a number of stacked angle plies are produced one after the other, where for each new ply the fibers need to be cut, or reversed in direction, causing segmentation or irregularities. The device and method of the invention allow to manufacture mentioned articles with constant properties in the longitudinal direction of the article in a reliable and economical way.

With the device and method according to the invention a composite laminate can be produced that consists of an arrangement of balanced angle plies, wherein different pairs of fiber orientations can be found in each ply (e.g. +α and −α in the first ply, and +β and −β in the next ply). This is in contrast with other known methods, such as the method described in FR 361387 A, in which a fiber structure is braided on a torus and the produced fiber orientations are fixed. Also, the device and method according to the invention allow to place the fibers on the mandrel without knotting the fibers (as in a braid). The fibers can therefore be positioned in a straight and well spread fashion, improving the laminate properties substantially. Ply properties will approach the properties of a unidirectional (UD) prepreg ply in terms of fiber straightness and fiber spreading.

With toroid-shaped is meant any shape in the form of a torus, i.e. a surface of revolution generated by revolving a closed contour, such as a circle for instance, in three dimensional space about an axis coplanar with the closed contour. In most contexts it is assumed that the axis does not touch the closed contour and in this case the surface has a ring shape and is called a ring torus or simply torus. It is also possible to generate a torus when the axis of revolution is tangent to the closed contour (horn torus) or when the axis is a chord of the closed contour (spindle torus). The toroid is the solid bound by the ring torus. A toroid-shaped product is typically continuous (endless). The device and method are particularly suitable for producing products that are shaped as a ring torus.

It should be noted and it is expressly stated that within the context of the present application toroid-shaped products also comprise products that are not completely rotation symmetrical. Such products may be obtained by revolving a closed contour in three dimensional space about an axis coplanar with the closed contour, which axis is different for each side of the torus. For instance the frame of a window, particularly an airplane window, is an endless product resembling a rectangle or a square with rounded of corners. Each side of such a frame forms part of a torus, albeit with a different axis of revolution for each side.

As will become more apparent below, the device according to the invention is able to place (dry) fibers or fiber composite material in the form of for instance prepreg tape or dry fiber textile structures, onto virtually any part of a toroid-shaped mandrel, as well as in virtually any direction.

A preferred embodiment of the device according to the invention is characterized in that, at least for one of the at least two dispensing units, the at least one delivery device is rigidly connected to its guide means, and the positioning means are arranged to move said guide means relative to the surface of the mandrel. Such an embodiment is relatively straightforward since it only requires the movement of the guide means and not of a number of delivery devices.

In another preferred embodiment of the invention, the device is characterized in that the positioning means are arranged to move the mandrel through the ring-shaped guide means of the at least two dispensing units.

Even more preferred is an embodiment of the device, wherein the positioning means are arranged to rotate the mandrel and the ring-shaped guide means around an axis perpendicular to the plane of the mandrel and perpendicular to the plane of the guide means respectively. The at least three rotary movements, that can be either controlled independently of each other or with the movements of the at least two guide means and/or delivery devices, coupled to one another, provide a device wherein the at least two dispensing units are adapted to place the fiber or fiber composite material onto the surface of the toroid-shaped mandrel in any direction with respect to the longitudinal axis of the mandrel, including directions that differ from the substantially perpendicular direction to the longitudinal axis.

In another preferred embodiment of the device according to the invention, the positioning means are adapted to place the fiber or fiber composite material onto the surface of the toroid-shaped mandrel in any direction with respect to the longitudinal axis of the mandrel, whereby the directions are defined within a tolerance of ±3 degrees, more preferably ±2 degrees, and most preferably ±1 degree.

There are several possibilities available to the skilled person to achieve a tolerance within ±3 degrees, more preferably ±2 degrees, and most preferably ±1 degree, one of the preferred ones being a device, wherein the positioning means are driven by servo-motors. Such a device is reliable and allows to place the fiber or fiber composite material onto the surface of the toroid-shaped mandrel in any direction within a tolerance of 1 degree or even of ±0.5 degree. This is important when manufacturing composite products, since the mechanical properties thereof highly depend on fiber directions.

By providing a device according to the invention, it becomes possible to produce toroid-shaped fiber composite products without requiring assembly of separately produced parts. This in particular has advantages when placing fibers or fiber composite materials with strong fibers onto the mandrel, since a product produced by the device and method of the invention does not likely show weak spots, such as typically encountered at locations of assembly. It is of course possible to further reinforce parts of the product, after having produced a product with the invented device. Such additional reinforcement can be achieved by hand lay up of fibers, tapes or other composite material forms.

In a preferred embodiment of the method according to the invention, the at least one delivery device is rigidly connected to the guide means and the guide means are moved relative to the surface of the mandrel, at least for one of the at least two dispensing units.

Even more preferred is a method, wherein the mandrel is moved through the ring-shaped guide means of the at least two dispensing units and, wherein the mandrel and the ring-shaped guide means are rotated around an axis perpendicular to the plane of the mandrel and perpendicular to the plane of the guide means respectively being the most preferred. It thus becomes possible to place the at least two fibers or fiber composite materials onto the surface of the toroid-shaped mandrel in any direction with respect to the longitudinal axis of the mandrel, the direction being determined by the relative movement of the mandrel and the dispensing units, in particular the movement of the delivery devices along and more preferably with the guide means. In a preferred method, the relative movements are selected such that the angle of a first fiber or fiber composite material with respect to the longitudinal axis of the mandrel, is equal but with different sign to the angle of a second fiber or fiber composite material with respect to the longitudinal axis of the mandrel. Increasing the speed of movement of the mandrel relative to the speed of movement of the delivery devices along or with the guide means will result in a direction that is closer to the longitudinal axis of the mandrel (small winding angles), whereas decreasing the speed of movement of the mandrel relative to the speed of movement of the delivery devices along or with the guide means will result in a direction that is closer to the direction perpendicular to the longitudinal axis of the mandrel (large winding angles).

Particularly preferred is a method, wherein the at least one fiber or fiber composite material per dispensing unit or guide means is placed onto the surface of the toroid-shaped mandrel in any direction with respect to the longitudinal axis of the mandrel, the direction being determined by the relative movement of the mandrel and the respective dispensing unit, in particular the movement of the delivery device, whereby the directions are defined within a tolerance of ±3 degrees, more preferably of ±2 degrees, and most preferably of ±1 degree. Such small tolerances are achievable by using a preferred embodiment of the device according to the invention.

The fiber or fiber composite material delivery devices or heads are configured to accept any fiber or fiber composite material form, such as dry fibers, polymer tapes and/or fiber composite prepreg tapes. The delivery heads may also comprise a heating system for heating prepreg materials for instance to increase tack levels for tape-to-tape adhesion. Other heating and consolidating methods are also suitable, such as for example the use of laser heating means. Multiple fiber delivery heads per guide means may be used but one delivery head per guide means is preferred. Delivery heads that are able to deliver a plurality of fibers may be used to increase production speeds. Such heads process multiple fiber bundles and/or strips of narrow tape. Individual prepreg fibers, called tows, may also be used. Fibers and tows are typically pulled off spools and fed through a fiber delivery system into the fiber delivery head. The fiber or fiber composite material delivery devices optionally include a tensioning system and/or a system to spread the fibers, to be able to place relatively thin layers of fibers onto the mandrel if desired. The delivery devices according to the invention allow to place fibers onto (parts of) the mandrel in virtually any direction, including the axial direction of the toroid-shaped mandrel, the hoop direction thereof, or any other circumferential direction in between the axial direction and the hoop direction.

Another preferred embodiment of the device according to the invention comprises at least two dispensing units that are positioned opposite to each other with respect to the geometrical center of gravity of the toroid mandrel. The geometrical center of gravity lies on the axis of revolution of the closed contour that generates the toroid. It is however also possible to provide at least two dispensing units that are not positioned opposite to each other with respect to the geometrical center of gravity of the toroid mandrel but are spaced over a shorter distance, such as spanned by a circumferential angle of 45° or any other angle.

By providing at least two dispensing units, several winding angles may be achieved for the same mandrel movement. It for instance becomes possible to place the fibers or fiber composite material in such directions that a so called angle ply composite laminate (±α) is produced in a number of passages of the mandrel, whereby, according to the invention, each ply (layer) of such an angle ply composite laminate comprises a substantially equal amount of +α and −α fibers.

A preferred embodiment of the method according to the invention therefore is characterized in that the at least one fiber or fiber composite material is dispensed from at least two dispensing units, whereby the delivery device of one dispensing unit moves in a direction that is opposite to the direction of the delivery device of another dispensing unit with respect to the motion of the mandrel. In another embodiment of the method according to the invention, the at least two dispensing units are positioned opposite to each other with respect to the geometrical center of gravity of the toroid mandrel.

The device according to the invention is equipped with positioning means to effectuate relative movement of the mandrel and the dispensing units during fiber or fiber composite material placement. Positioning the mandrel relative to the dispensing units may be effectuated by any means known in the art. A preferred embodiment of the device has positioning means comprising a rotating disk that frictionally drives a surface of the mandrel thereby bringing the mandrel in rotation. In this embodiment, the mandrel is rotated through (positionally) stationary dispensing units. It is also possible to move the dispensing units relative to the mandrel however, for instance by positioning means in the form of a robotic guiding apparatus, or a plurality of robots. This latter option using robots is not preferred however. In order to accommodate mandrels of varying dimensions, the dispensing units are preferably repositionable in a number of positions that differ in their distance to the center of gravity or rotation of the mandrel, or that slightly differ in their orientation/rotation with respect to the circumferential direction of the mandrel.

A particularly favorable device according to the invention comprises planar ring-shaped guide means of the dispensing units, and further has positioning means that are arranged to move the mandrel through the dispensing units with the plane of the guide means substantially perpendicular to the longitudinal axis of the mandrel. With substantially perpendicular is meant in the context of the present application any angle that deviates not more than 10° from the perpendicular angle (90°), i.e. any angle ranging from 80° to 100°. The toroid-shaped mandrel is an endless elongated structure that in an embodiment of the invention is rotated around an axis about perpendicular to the plane of the mandrel. The longitudinal axis of the mandrel is defined as the axis running in the direction of rotation, the circumferential directions being perpendicular to the longitudinal direction. Moving the mandrel through the dispensing units with the planes of the guide means perpendicular to the longitudinal axis of the mandrel therefore corresponds to a situation in which the mandrel is moved through the guide means whereby its axis of rotation is found as the line of intersection of the planes of the guide means. This does not hold when the planes of the guide means are not perfectly perpendicular to the longitudinal axis of the mandrel.

In order to enable bringing the mandrel within the perimeter of the dispensing units, the mandrel and/or each of the guide means of the at least two dispensing units comprise at least two parts that may be (partly) separated. In a preferred method according to the invention, the at least two parts of the guide means of the dispensing units are (partly) separated whereafter the dispensing units are brought in and out of the perimeter of the toroid-shaped mandrel. In the method according to the invention, the at least two parts of the guide means of the dispensing unit(s) are (partly) separated to bring the dispensing unit(s) in and out of the perimeter of the toroid-shaped mandrel. Another preferred embodiment comprises a device, wherein the ring-shaped guide means of the at least two dispensing units comprise an open segment that is large enough to make the inner space of the ring-shaped guide means accessible to the mandrel.

In another aspect of the invention, the device comprises means to reshape, and preferably thermoform at least a part of the mandrel. Many toroid-shaped products have a concave cross-section (corresponding to the revolving closed contour, see definition of a toroid above). This is for instance the case for a bicycle wheel rim. Such a rim has a convex surface facing the hub of the wheel, but is concave-shaped at the tire side to accommodate the inflated tire. It is not generally possible to place the fibers or fiber composite material onto a concave surface. Indeed in many cases the fibers or fiber composite material will span the concave surface portion. The means to reshape at least part of the mandrel allow to place the fibers or fiber composite material onto the surface of a mandrel with a convex cross-section, and thereafter reshape at least said part of the mandrel to obtain a concave cross-section. In this process, the fiber or fiber composite material that has been positioned on the mandrel preferably moves together with said part.

A particularly preferred embodiment of the device according to the invention has means to thermoform that comprise a heatable pressure roll. Such a heatable pressure roll can be given a surface that substantially conforms to the concave surface portion of the mould and/or the desired concave surface portion of the composite product. In a preferred method thermoforming is carried out by pressing the heated pressure roll against said reshapeable part of the mandrel (and therefore also against the fiber or fiber composite material placed on that part), or vice versa. Pressing with the heated pressure roll will thermoform said part and will push the fibers or fiber composite material against the concave surface portion of the mould. The fibers or fiber composite material have a certain length when spanning the convex part. In order to conform to the concave surface after reshaping or thermoforming, the fibers or fiber composite material preferably have a length after reshaping or thermoforming that is about equal to the length before reshaping or thermoforming. A preferred device therefore has a reshapeable part of which the cross-section is about symmetrical with respect to the imaginary line that connects the end points of the cavity of the desired concave cross-section after reshaping. Heating the fibers or the fiber composite material may enhance the deformation possibilities of the fibers or the fiber composite material when reshaping the mandrel.

In an embodiment of the method according to the invention, and in case a thermoformable fiber composite material is used, at least a part of the fiber composite material, placed on the mandrel is also thermoformed, preferably a part that covers a part of the mandrel having a concave cross-section, and more preferably by pressing the (part of) fiber or fiber composite material against a heated pressure roll.

According to some preferred embodiments of the device and method of the invention, part of the mandrel should be reshapeable. The mandrel according to the invention may to this end be inflatable. Continuous fiber composite products are difficult to transport, since by its very nature the mandrel usually remains inside the product. When using an inflatable mandrel, the mandrel can be inflated before actual filament winding or tape laying starts, can remain in the inflated state during filament winding or tape laying and can be deflated again after filament winding or tape laying has been finished. It is also possible to leave such a (light-weight) mandrel inside the product. Although the use of an inflatable mandrel may be preferred in certain circumstances, other methods may also be used, such as the use of sand-filled mandrels, foldable mandrels, foamed mandrels, and so on. Another possibility is to provide a mandrel made partly or wholly from a reshapeable or thermoformable material, such as a thermoformable foam of polystyrene, polyurethane or any other suitable polymer. Still another possibility is to provide a mandrel made partly or wholly from a soluble material, such as Aquapour®. It is also possible to provide a mandrel of which the reshapeable part is deflatable or even removable. Most preferred is a mandrel of which at least the reshapeable part is made from a reshapeable or thermoformable material, such as a thermoformable foam of polystyrene, polyurethane or any other suitable polymer.

The above described method according to the invention is particularly suitable for producing toroid-shaped fiber composite products, in which method a continuous (endless) mandrel is preferably used. Other preferred embodiments of the invented method are described in the attached claims. In the method, the mandrel is typically made of thermoformable foam and optionally removable from the formed product after all fibers and/or fiber composite material have been positioned onto the mandrel, and the thus obtained product has been optionally provided with resin and cured to obtain the final end product, optionally also after having thermoformed certain parts of the product as described above. It is also possible however to employ a mandrel that remains in the end product. Typically removable mandrels comprise inflatable mandrels. When using an inflatable mandrel, the mandrel can be inflated before actual fiber or tape positioning starts, can remain in the inflated state during fiber or tape positioning, and can be deflated after fiber or tape positioning has been finished. It is also possible to leave such a (light-weight) mandrel inside the product. Although the use of an inflatable mandrel may be preferred in certain circumstances, other methods may also be used, such as the use of sand-filled mandrels, foldable mandrels, foamed mandrels, and so on, foamed mandrels being preferred.

Although dry fibers are most preferably used in the method according to the invention, fiber composite materials may also be used. The fiber composite materials typically used in the device and method of the invention comprise reinforcement fibers and/or matrix materials. Preferred are reinforcement fibers, embedded in a matrix material, preferably a polymer. Suitable reinforcement fibers include glass fibers, carbon and graphite fibers, metal fibers, drawn polymeric fibers, such as aramid fibers, PBO fibers (Zylon®), M5® fibers, ultrahigh molecular weight polyethylene or polypropylene fibers or tapes, as well as natural fibers, such as flax and wood fibers, and/or combinations of said fibers.

The product produced is preferably built up of several layers of fiber composite material, the latter preferably comprising substantially continuous fibers that extend in one direction. Preferably, the fibers are positioned onto the mandrel in the dry state and supplied with matrix resin after positioning has been substantially completed. Providing the positioned fibers with resin is preferably carried out by resin infusion, or by resin transfer molding, in which process the intermediate product is enclosed in a closed rigid mould or flexible bag, wherein resin is sucked or forced under the application of a pressure difference. The infused resin impregnates the fibers and, after curing yields the fiber composite product. The fiber volume fraction of the fiber composite material or product can be varied from low values of for instance 10 vol.-% to values of more than 65 vol.-%. It is therefore within the scope of the present invention to use a fiber composite material dispensing unit, adapted to place a fiber or fibers onto the surface of a mandrel having any shape or onto a layer of fiber (composite) material already placed on the mandrel. To obtain the fiber composite product, the fiber preform thus obtained can thereafter be impregnated with a suitable resin if desired. It is possible to combine the method according to the invention with other methods for manufacturing composite products, such as hand lay-up for instance. In an example, a toroid-shaped composite product is first produced by the method of the invention in which the majority of the fibers are placed onto the surface of the mandrel, as described herein. Intricate parts of the structure may then further be reinforced with additional fibers and resin by hand lay-up and/or by applying fiber composite prepreg tape. However, in a typical case according to the invention, the composite product is produced by filament winding only.

Figure 2A:
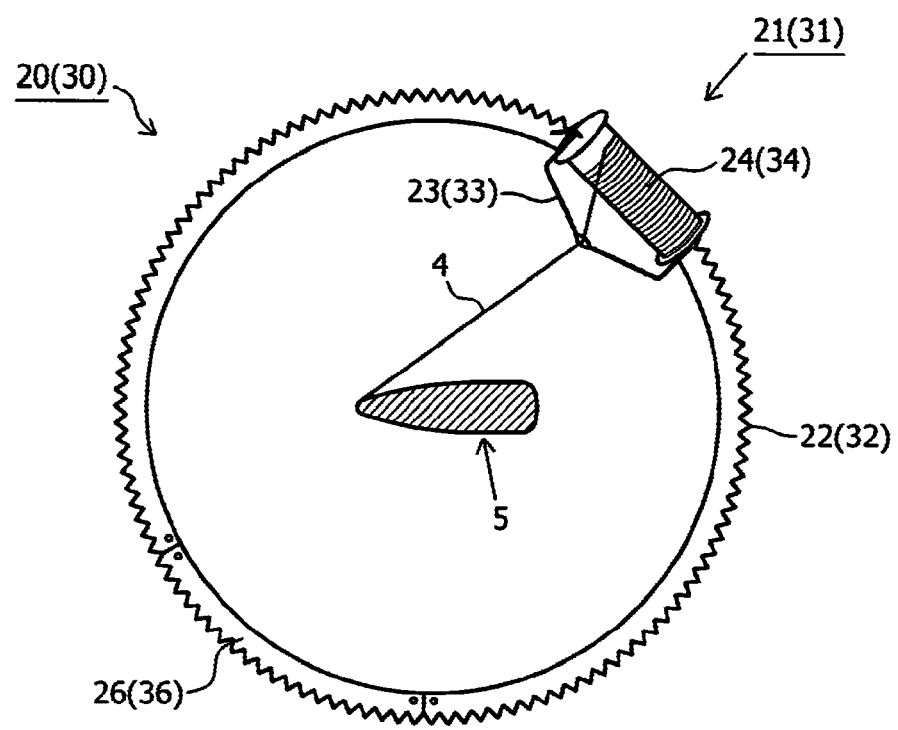
Figure 2B:
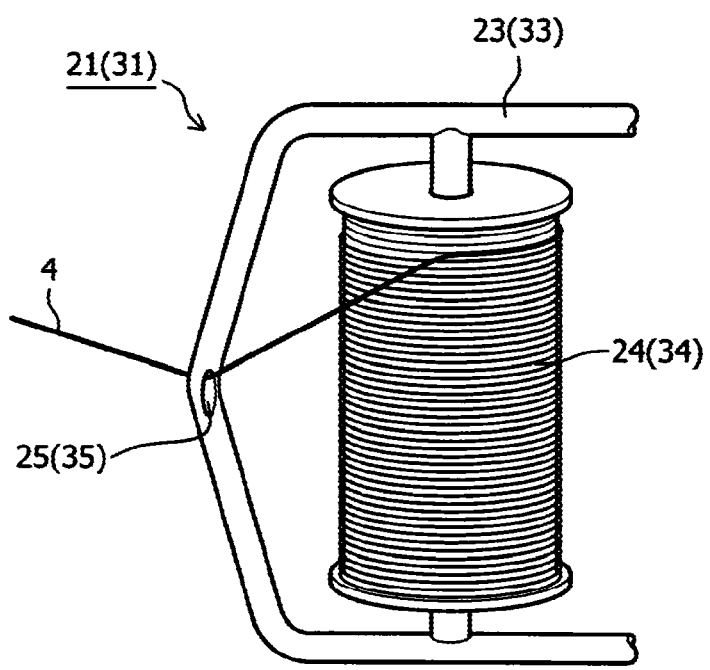
Figure 3:
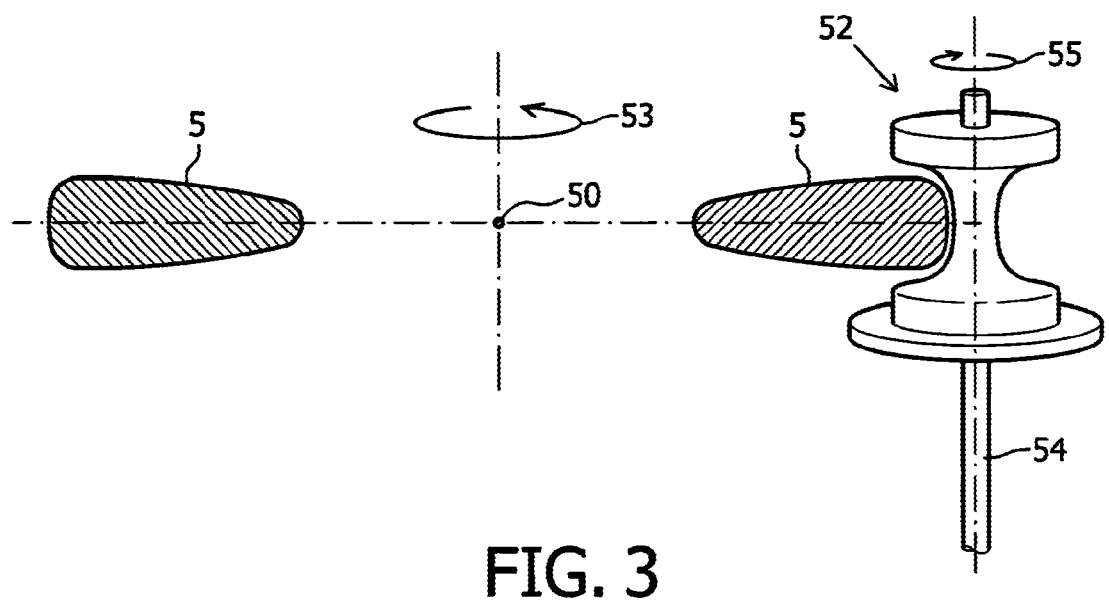
Figure 4:
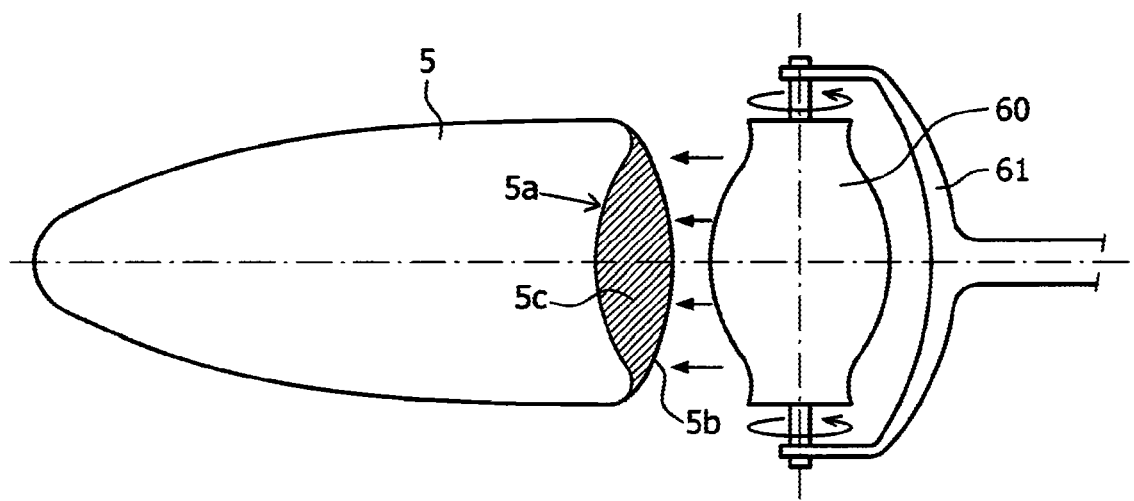
Figure 5A:
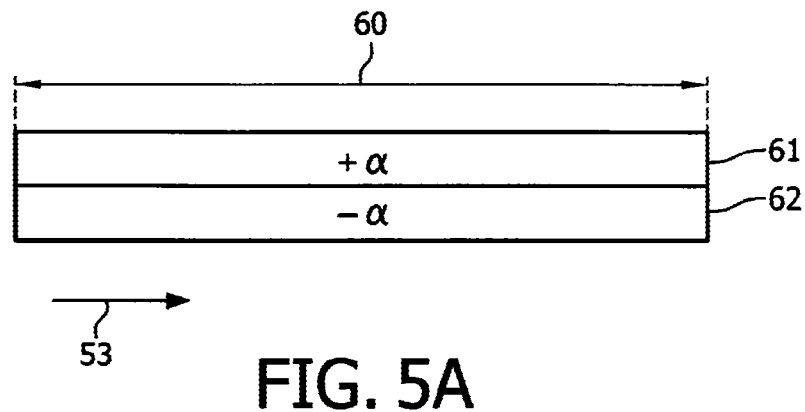
Figure 5B:
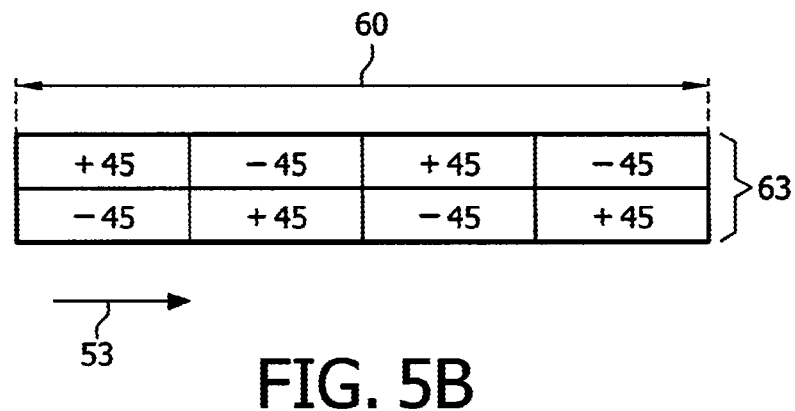
Figure 5C:
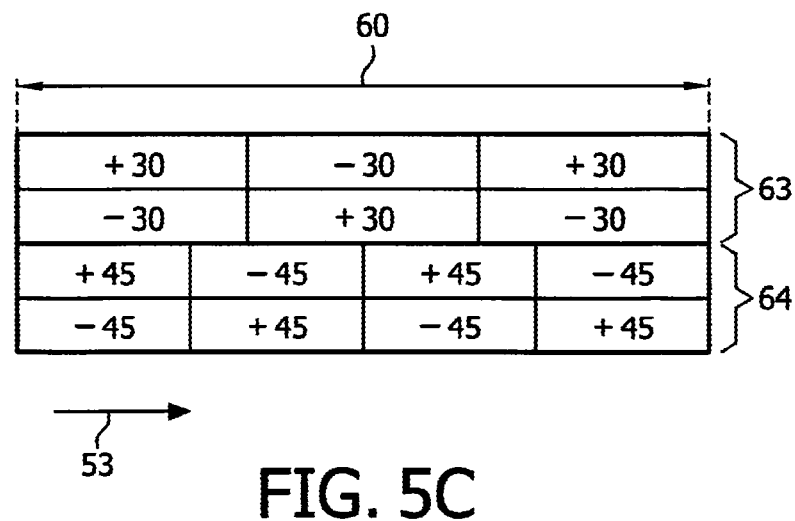

The invention will now be explained in greater detail by means of the enclosed figures, without however being limited thereto. In the figures:

FIG. 1 schematically shows a perspective view of a device in accordance with an embodiment of the present invention;

FIG. 2A schematically shows a front view of an embodiment of a dispensing unit according to the present invention;

FIG. 2B schematically shows a side view of an embodiment of a fiber delivery device according to the present invention;

FIG. 3 schematically shows an embodiment of the guiding device for mandrel rotation according to the invention;

FIG. 4 schematically shows the thermoforming device according to the invention; and FIGS. 5A, 5B and 5C schematically show a number of laminates produced by the method according to the invention.

With reference to FIG. 1, part of an embodiment of a device 1 for producing a toroid-shaped fiber composite product is shown. The device 1 in the embodiment shown comprises two fiber dispensing units 2 and 3, that are in a stationary position. Dispensing units 2 and 3 are adapted to place a fiber 4 (or a plurality of fibers) onto the surface of a toroid-shaped mandrel 5. The two dispensing units (2, 3) each comprise a ring-shaped guide means (20, 30) that surround the mandrel 5 in a circumferential direction R thereof. In the embodiment shown, the ring-shaped guide means (20, 30) are planar and arranged to move the mandrel 5 through the dispensing units (2, 3) with the plane of the guide means (20, 30) substantially perpendicular to the longitudinal axis of the mandrel 5. Guide means (20, 30) are positioned opposite to each other with respect to the geometrical center of gravity 50 of the toroid mandrel 5. Other configurations however are possible. As shown in FIG. 2A each ring-shaped guide means (20, 30) comprises a part (26, 36) that may be separated from the rest of the guide means (20, 30) to allow to bring the mandrel 5 within the perimeter of guide means (20, 30) and vice versa.

Fibers 4 are delivered from two fiber delivery devices (21, 31) shown in more detail in FIGS. 2A and 2B. As shown in FIG. 2A, delivery devices (21, 31) are substantially rigidly connected to their respective guide means (20, 30). The guide means (20, 30) are movable (rotatable) by providing the guide means (20, 30) with treads (22, 32) and by providing servo motors. Other driving means are possible. The speed of movement (rotation) of the ring-shaped guide means (20, 30) and therefore also of the delivery devices (21, 31) can be regulated accurately by the servo motors. Delivery devices (21, 31) (see FIG. 2B) each comprise a frame (23, 33) that is attached to the respective ring-shaped guide means (20, 30) and wherein a spool or roller body (24, 34) is rotatably suspended. Roller body (24, 34) is provided with fibers 4 that are fed through a feed eye (25, 35) of the frame to the mandrel 5. The distance between the suspension of the roller body (24, 34) and the feed eye (25, 35) may be adjustable. In order to accommodate mandrels 5 of varying dimensions, the guide means (20, 30) are preferably repositionable in a number of positions along line 100, which positions differ in their distance to the axis of rotation 53 of the mandrel.

Apart from the described guide means (20, 30) provided with delivery devices (21, 31), the positioning means comprise four rotating disks 52 (see also FIG. 3) on a standard 54, that rotate in a direction 55 opposite the rotation direction 53 of the mandrel 5, and frictionally drive the outer surface of the mandrel 5, thereby bringing the mandrel 5 in rotation in the direction 53. At least one of the disks 52 is driven. Although four rotating disks 52 are shown in the figure, preferred embodiments comprise three rotating disks 52 only. To provide minimal friction (but enough to drive the mandrel 5) between the surface of the disks 52 and the surface of the mandrel 5, the latter being typically provided with fibers or fiber composite material, the shape of the surface of the disks is adapted to the shape of the surface of the mandrel 5. By adjusting the speed of movement of the delivery devices (21, 31) relative to the speed of rotation of the mandrel 5, the direction in which the fibers 4 are laid down onto the surface of the mandrel 5 (onto which fibers may already have been positioned) may be regulated at will. The two dispensing units are adapted to place the fibers 4 onto the surface of the toroid-shaped mandrel 5 in any direction with respect to the longitudinal axis of the mandrel, including directions that differ from the substantially perpendicular direction to the longitudinal axis, and directions that differ between dispensing unit 2 or 3. Indeed, the fiber angle laid down by one dispensing unit 2 differs from the fiber angle laid down by the other dispensing unit 3 when the speed of movement of delivery device 21 differs from the speed of movement of delivery device 31. Due to the use of servo motors, the positioning means (21, 22, 31, 32, 52) are able to place the fibers 4 onto the surface of the toroid-shaped mandrel 5 in directions that are defined within a tolerance of ±1 degree. By providing two dispensing units (2, 3) from which the fibers 4 are dispensed, several winding angles may be achieved for the same mandrel 5 movement. It for instance becomes possible to place the fibers 4 in such directions α that a composite laminate, consisting of balanced angle plies $[\pm\alpha]_n$, is produced in more than n passages of the mandrel 5 (n is the number of layers). It will generally require multiple passages of the mandrel 5 before one layer of fibers or fiber composite material completely covers the surface of the mandrel. To achieve a balanced angle ply, as shown in FIG. 1, the two dispensing devices (21, 31) are positioned substantially along two different circumferential planes. Shown is the arrangement in which the dispensing devices (21, 31) are opposite to each other with respect to the geometrical center of gravity 50 of the toroid-shaped mandrel 5, and along a line 100. When viewed in the direction of line 100, the dispensing device 21 dispenses fibers 4 on the left side of the ring-shaped guide means 2, whereas the dispensing device 31 dispenses fibers 4 on the right side of the ring-shaped guide means 3. In this way, an angle ply composite laminate is easily produced, with a coupled motion between dispensing device 21 and dispensing device 31 preferably.

The device according to the embodiment shown in FIG. 4 further comprises means to thermoform at least a part of the mandrel 5. The means to thermoform comprise a heatable pressure roll 60, rotatably provided in a frame 61.

To produce a toroid-shaped fiber composite product, a toroid-shaped mandrel 5 is provided and a plurality of fibers 4 dispensed from the dispensing units (2, 3), described in detail above. The fibers 4 are placed onto the mandrel 5 while effectuating a relative movement of the mandrel 5 and the dispensing units (2, 3). The speed of the relative movements determines the fiber angle with respect to the longitudinal direction of the mandrel 5, whereby the mandrel 5 is moved through the two dispensing units (2, 3) that are in a stationary position. As shown in FIG. 4, a part 5a of the mandrel 5 (and product) may have a concave cross-section. In the method of the invention this part 5a is filled up, for instance with a thermoformable foamed or expanded part 5c, to produce a convex cross-section 5b of mandrel 5. Even more preferred is to provide a substantially complete mandrel out of such thermoformable foamed or expanded material. After having positioned the fibers 4 onto this part 5b, the foamed or expanded part 5c is compressed and thermoformed by pressing the part 5b of the fibers against the heated pressure roll 60 that has a surface in the shape of part 5a. In this embodiment, the fibers 4 typically have not been provided with a matrix resin yet. The shape of the heated pressure roll 60 determines the shape of the concave part of the composite product.

In an alternative embodiment, the foamed or expanded part 5c is made of deflatable material and deflated when pressing this part 5c against the pressure roll 60 that has a surface in the shape of part 5a.

It is also possible to build up several layers of fibers or fiber composite material by moving the mandrel 5 through the two dispensing units (2, 3) in the same direction a number of times, the number of 'rounds' being significantly larger than the desired number of layers, since for each round only a part of the mandrel surface is covered with fiber or fiber composite material in most situations. Only for angles that do not differ substantially from a perpendicular direction to the longitudinal direction, the number of 'rounds' may be substantially equal to the number of layers. If desirable, the fiber angle may be changed between rounds by changing the speed of movement of the delivery devices (20, 30).

After the fiber or fiber composite material positioning operation is terminated, and the concave parts of the product have been formed by reshaping or thermoforming corresponding parts of the mandrel, the assembly of mould and product is transferred to a resin transfer mould, and the fibers provided with a matrix resin, preferably by resin transfer molding, whereafter the composite product is (at least partly) cured. The manufactured part may also be postcured afterwards in a separate step by applying heat, and/or by laser curing for instance. It is also possible to harden the matrix resin in situ by laser heating or by any other means.

The final composite product has increased strength and stiffness, due to the fact that the produced product is produced in substantially one piece, and may at least partly have a concave cross-section. A considerable advantage is indeed that the product has only a few or no internal fiber or fiber composite material discontinuities, since the article is produced with a low number of continuous fibers or fiber composite material forms.

The use of at least two fiber or fiber composite material dispensing units 2 and 3 makes it possible to place fibers under a positive angle (+α) with the longitudinal axis of the mandrel by the first dispensing unit 2, and positionally thereafter place fibers under a negative angle (−α) with the longitudinal axis of the mandrel by a second dispensing unit 3, whereby dispensing unit 3 positionally lags behind the first dispensing unit 2. This arrangements allows to produce laminates that differ from those manufactured with the known method. Referring to FIG. 5A, a laminate obtainable by the known method is shown. The shown laminate is a cross-section of a piece of laminate with length 60 viewed from the geometrical center of gravity 50 of the toroid-shaped mandrel 5. The shown known laminate comprises two plies (61, 62) whereby each ply comprises fibers under one angle (either +α or −α) with the longitudinal axis of mandrel 5 only. Obviously, more plies may be present in the laminate. As is shown in FIG. 5B, the device of the invention allows to produce a ply 63 (a layer) wherein both (+α) and (−α) fiber angles (for instance +45° and −45°) are present in an alternating fashion in substantially the same amount. Such a balanced angle-ply 63 may be produced in one revolution of the mandrel relative to the dispensing units 2 and 3, although more revolutions may be needed for complete coverage of the mandrel in case of smaller fiber angles for instance or small fiber width. As shown in FIG. 5C, several of such balanced angle plies (63, 64) may be stacked on top of each other to obtain a laminate according to the invention by applying a series of different relative movements between the mandrel (5) and the dispensing units (2, 3), first creating a certain balanced angle ply, and thereafter adjust the relative velocities of mandrel and dispensing devices to create a balanced angle ply with another orientation. Changing the relative speeds of movement of the dispensing units 2 and 3 and mandrel 5 during the process yields different fiber angles, as shown in the example (45° and 30°) and therefore distinct balanced angle plies 63 and 64. The produced laminate however is balanced on a (angle) ply level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for producing a toroid-shaped fiber composite product, the device comprising:
    at least two fiber or fiber composite material dispensing units, being adapted to place a fiber or a fiber composite material onto the surface of a toroid-shaped mandrel; and
    positioning means arranged to effectuate relative movement of the mandrel and the dispensing units during placement of the fiber or fiber composite material;
    wherein the at least two dispensing units each comprise
    a ring-shaped guide means that surrounds the mandrel in a circumferential direction thereof; and
    at least one fiber or fiber composite material delivery device for placing said material onto the surface of the mandrel, the delivery device being movable along or with the guide means relative to the surface of the mandrel; and wherein the at least two dispensing units are spaced apart over some distance in the circumferential direction of the mandrel and they are adapted to place the fiber or fiber composite material onto the surface of the toroid-shaped mandrel in any direction with respect to the longitudinal axis of the mandrel, including directions that differ for each dispensing unit.

2. Device according to claim 1, wherein the at least one delivery device is rigidly connected to the guide means, and the positioning means are arranged to move the guide means relative to the surface of the mandrel.

3. Device according to claim 1, wherein the positioning means are arranged to move the mandrel through the ring-shaped guide means of the at least two dispensing units.

4. Device according to claim 2, wherein the positioning means are arranged to rotate the mandrel and the ring-shaped guide means around an axis perpendicular to the plane of the mandrel and perpendicular to the plane of the guide means respectively, the at least three rotary movements being controllable independently of each other.

5. Device according to claim 1, wherein the positioning means are adapted to place the fiber or fiber composite material onto the surface of the toroid-shaped mandrel in any direction with respect to the longitudinal axis of the mandrel, whereby the directions are defined within a tolerance of ±1 degree.

6. Device according to claim 5, wherein the positioning means are driven by servo-motors.

7. Device according to claim 1, comprising at least two dispensing units that are positioned opposite to each other with respect to the geometrical center of gravity of the toroid mandrel, and comprising one delivery head per guide means.

8. Device according to claim 7, wherein the dispensing units are repositionable in a number of positions that differ in their distance to the center of gravity or rotation of the mandrel.

9. Device according to claim 7, wherein the positioning means that control the position of the mandrel comprise a rotating disk that frictionally drives a surface of the mandrel thereby bringing the mandrel in rotation.

10. Device according to claim 1, wherein the planes of the ring-shaped guide means of the at least two dispensing units are substantially perpendicular to the longitudinal axis of the mandrel, and wherein the positioning means are arranged to move the mandrel through the dispensing units.

11. Device according to claim 1, wherein the ring-shaped guide means of the at least two dispensing units comprise an open segment that is large enough to make the inner space of the ring-shaped guide means accessible to the mandrel.

12. Device according to claim 1, wherein at least a part of the mandrel is reshapeable and the device comprises means to reshape at least said part of the mandrel.

13. Device according to claim 12, wherein the means to reshape comprise thermoforming means, preferably a heatable pressure roll.

14. A method for producing a toroid-shaped fiber composite product, the method comprising:
 providing a toroid-shaped mandrel;
 dispensing at least one fiber or fiber composite material from at least two dispensing units, each comprising a ring-shaped guide means that surrounds the mandrel in a circumferential direction thereof, along or with which guide means a delivery device is moved relative to the surface of the mandrel;
 placing the at least one fiber or fiber composite material per guide means onto the mandrel while effectuating a relative movement of the mandrel and the at least two dispensing units; wherein the at least two dispensing units are spaced apart over some distance in the circumferential direction of the mandrel and they are adapted to place the fiber or fiber composite material onto the surface of the toroid-shaped mandrel in any direction with respect to the longitudinal axis of the mandrel, including directions that differ for each dispensing unit.

15. Method according to claim 14, wherein the at least one delivery device is rigidly connected to the guide means and the guide means are moved relative to the surface of the mandrel.

16. Method according to claim 14, wherein the mandrel is moved through the ring-shaped guide means of the at least two dispensing units.

17. Method according to claim 15, wherein the mandrel and the ring-shaped guide means are rotated around an axis perpendicular to the plane of the mandrel and perpendicular to the plane of the guide means respectively.

18. Method according to claim 14, wherein the at least one fiber or fiber composite material per dispensing unit is placed onto the surface of the toroid-shaped mandrel in any direction with respect to the longitudinal axis of the mandrel, the direction being determined by the relative movement of the mandrel and the at least two dispensing units, in particular the movement of the delivery devices, whereby the directions are defined within a tolerance of ±1 degree.

19. Method according to claim 14, wherein the at least one fiber or fiber composite material per dispensing unit is dispensed from at least two dispensing units, whereby the delivery device of one dispensing unit moves in a direction that is opposite to the direction of the delivery device of another dispensing unit relative to the motion of the mandrel.

20. Method according to claim 19, wherein the at least two dispensing units are positioned such that their planes are substantially perpendicular to the longitudinal axis of the mandrel and the distance of the at least two dispensing units to the geometrical center of gravity of the toroid mandrel is equal.

21. Method according to claim 14, wherein a mandrel is provided with at least a reshapeable part, and wherein said part is reshaped after having placed fibers or fiber composite material onto the mandrel and said part, during which reshaping step the fibers or fiber composite material substantially move with said part.

22. Method according to claim 21, wherein the mandrel has a convex cross-section, part of which is reshapeable and wherein said reshapeable part is reshaped such that the cross-section becomes concave.

23. Method according to claim 21, wherein reshaping is carried out by thermoforming, and preferably by pressing a heated pressure roll against said reshapeable part.

24. Device according to claim 1, wherein the delivery device of one dispensing unit is capable of moving in a direction that is opposite to the direction of the delivery device of another dispensing unit with respect to the longitudinal axis of the mandrel.

* * * * *